Patented May 29, 1951

2,554,873

UNITED STATES PATENT OFFICE 2,554,873

OAT EXTRACT COMPOSITION

Sidney Musher, New York, N. Y., assignor to Musher Foundation Incorporated, New York, N. Y., a corporation of New York No Drawing. Original application July 31, 1945, Serial No. 608,095. Divided and this application November 17, 1950, Serial No. 196,357

6 Claims. (Cl. 99—22)

The present invention relates to a special oat fraction which has greatly reduced viscosity characteristics without substantial alteration in its chemical constituents and to methods by which such reduction in viscosity can be accomplished.

A certain oat fraction develops particularly high viscosity and gum characteristics when dispersed in water. It is desirable for certain purposes, however, to utilize this oat fraction freed of these high viscosity characteristics and for this to be accomplished by economical and readily available means.

An object of this invention is, therefore, to produce the special oat fraction, which is more specifically set forth below, in such a manner that it does not develop a high viscosity when dispersed in water, milk or similar aqueous medium.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, the special oat fraction is subjected to dry heat at a temperature of over about 180° F. and desirably over 200° F. while in substantially dry condition and without water dispersion.

The special oat fraction which may be heated in dry condition is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized desirably in an attrition mill to such an extent that about 85% to 95% will pass through a screen or mesh or bolting cloth having a fineness in excess of about 60 mesh and desirably having a fineness in excess of 70 mesh.

The oat groats are ground as indicated above and the ground groats are then separated desirably by aspirating or otherwise by screening into two fractions, namely, a coarse fraction and a fine fraction, the coarse fraction comprising the minor fraction of less than about 15% by weight and most desirably comprising 5% to 15% of the total weight of the ground oat groats and the fine fraction comprising at least 85% and most desirably between about 85% and 95% of the total weight of the ground oat groats.

It is the coarse residue which is left after such grinding and screening or bolting or particularly after aspirating which is found to have the properties most desirable for use in accordance with the present invention and the desired effect is most particularly observed after the coarse fraction has all been ground to a fineness of at least 50 mesh and most desirably to at least 60 mesh.

In the preferred procedure, the oat groats, after removal of the hulls, are pulverized or ground and then desirably by aspirating or less preferably by bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction, this fraction desirably to be ground to at least 50 mesh for use in accordance with the procedures of the present invention.

The coarse fraction obtained will generally have a protein content in excess of 20% and more desirably in excess of 22%. At the same time the starch content of the coarse fraction will be reduced to much less than the starch content of the fine fraction.

According to one method of separating the relatively high starch fraction which is necessary to obtain the gelatinous properties in most highly developed condition, the groats are ground so that at least about 85% will have a fineness in excess of about 60 mesh and desirably at least 60% to 70% of the ground material will have a sufficient fineness to go through about a 90 mesh screen.

Then the ground material is aspirated or less preferably screened to remove all particles which will not go through a 60 mesh screen.

A most highly desirable method is to grind the oat groats until between 85% and 95% will go through a 70 mesh screen but wherein the balance of between 5% and 15% remains on the screen. Then the ground groats are aspirated or screened to remove all the coarse particles and to separate the fine fraction comprising 85% to 95% from the coarse fraction comprising the balance of 5% to 15% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content.

This course, relatively low starch and relatively high protein material is preferably then finely divided before heating in accordance with the procedures of the present invention.

These coarser particles in which the stabilizing properties are concentrated are most desirably ground such as in a hammer or stone or attrition mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

Although the chemical composition may vary it has been found that 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

This relatively high protein fraction and desirably after grinding so that it will go through at least a 50 mesh screen is then placed in pans or in a revolving drum or otherwise dry heated until it reaches a temperature of at least about 180° F. and preferably 200° F. or higher. The special oat fraction may be held at that temperature for a short time as from several minutes to half an hour.

The dry heated special oat fraction no longer exhibits the tendency to increase in viscosity when dispersed in water, milk, or other aqueous medium. For example, in the test given below, the viscosity of a 7% dispersion of the finely divided special oat fraction in water was determined as the number of seconds required for the dispersion to flow out of the bulb of a specially calibrated pipette after allowing to stand for stated periods.

| | Viscosity After— | | |
|---|---|---|---|
| | 1 minute | 10 minutes | 20 minutes |
| Finely divided special oat fraction unheated | Seconds 11.3 | Seconds 27 | Seconds 59 |
| Finely divided special oat fraction heated dry to 150° F. for 5 minutes | 11.2 | 26 | 57.4 |
| Finely divided special oat fraction heated dry to 180° F. for 5 minutes | 6.3 | 6.4 | 6.4 |

Where desired, the unground coarse fraction may, after separation from the fine fraction, be dry heated at over about 180° F. followed by finely dividing the heated coarse fraction so that it goes through at least a 50 mesh screen and preferably through over a 60 mesh screen. Where the unground coarse fraction is, however, heat treated before grinding, it is preferable to heat the special coarse fraction in dry form at least to about 210° F.

It is also possible to heat the oat groats to a temperature of about 250° F. or more or to subject them to a dry roasting at at least 250° F. The heated groats may then be ground and the minor portion of the coarse fraction may be separated from the major portion of the fine fraction to obtain the relatively high protein fraction as above described. The high protein fraction may then be pulverized as above set forth.

By the treatment described in this application, it has been found possible to flake or roll the heated coarse special oat fraction or to compress the heated finely divided special oat fraction to produce a non-gummy high protein special oat fraction which when added to water, milk, or similar aqueous composition will not become gummy or exhibit high viscosity characteristics.

For example, the heated, finely divided special oat fraction may be sprayed with water in order to increase its moisture content to about 13% to 18% and then pelleted or compressed in order to form relatively large size particles which may be used as a breakfast cereal or as an infant food.

Furthermore, following the dry heat treatment herein described, the special oat fraction may be gelatinized as by heating in aqueous dispersion (for example, by the use of 2 to 4 parts of water to each part of the special oat fraction) to a temperature of over about 160° F. followed by drying, particularly by drum drying.

The heated, non-gummy, high protein oat fraction may very desirably be employed as an infant food or as a breakfast cereal. It may furthermore be readily employed for solvent extraction to remove water soluble extracts therefrom as, for example, vitamin B complex syrups or antioxygenic extracts which extraction procedures would otherwise not be possible on account of the rapid increase in viscosity upon water dispersion.

The oat composition of reduced viscosity characteristics, as for example, the heated non-gummy special oat fraction may be extracted with water by using between 4 and 9 parts of water to each 1 part of oats with agitation, preferably adjusting the pH to between 4 and 4.5 and at a temperature of about 120° F. to 135° F. followed by removing the residues and concentrating the clear soluble fraction to between 45% and 65% total solids. The said concentrated fraction may then be treated with about 7 parts of a 60% low molecular weight aliphatic alcohol and 40% water mixture to each part of the total solids of the concentrated fraction, removing the insoluble material, then concentrating the alcohol soluble fraction to between 70% and 80% total solids.

Another method is to extract the heated special oat fraction with water using about 1 part of the special oat fraction to between 4 and 6 parts of water at between 110° F. and 135° F. and at pH between 4.0 and 6.0, followed by removing the undissolved solids concentrating the soluble portion to over about 27° Baumé, adjusting the concentrate by adding caustic alkali to pH of between 6.8 and 7.5 preferably with heating, diluting with water to obtain fluidity, removing the undissolved solids, adjusting the pH of the soluble portion to between 5.0 and 6.0 and then concentrating the purified extract to at least about 27° Baumé and preferably to between 70% and 80% total solids.

Where desired, the fat may be extracted from the heated finely divided special oat fraction of the present invention such as by treatment of the heated special oat fraction or of the heated finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

The special coarse oat fraction may or may not be finely divided and may or may not first have been heat treated before subjecting to fat extraction. The heat treatment may either precede or follow fat extraction and where desired the heat treated fat extracted product may be pulverized to 75 mesh to 90 mesh or more.

By the term "finely divided" as used in connection with the special oat fraction of the present invention in the application and claims is meant the oat fraction which has been subdivided to a state of fineness that will enable it to go through at least about a 50 mesh screen.

By the term "dry milled oat product" as used in the present application and claims is meant an oat product which has been subjected to either grinding, screening, bolting, aspirating or combinations thereof or even to oil solvent extraction.

By the term "total protein" is meant the total amount of protein present in the special oat fraction of the present invention.

By the term "dry heated" or "dry heat treated" as used in this specification or in the claims hereof is meant the treatment of the special oat fraction to a temperature of at least about 180° F. while in substantially dry or in normally dry condition as with a moisture content under about 13% and preferably under 10% and without dispersing the product in water or aqueous composition during the heat treatment.

The dry heat treated special oat fraction may be used as an ingredient in food compositions where greatly reduced gum or viscosity characteristics are desired or as an infant or baby food as by gelatinizing with or without drying, or as a breakfast cereal as by forming flakes or pellets.

This application is a division of application Serial No. 608,095 filed July 31, 1945, entitled "Oat Composition of Reduced Viscosity Characteristics."

Having described my invention, what I claim is:

1. A water extract of an over 180° F. dry heated, finely divided special oat fraction, said fraction having a fineness of at least about 60 mesh, said fraction containing in excess of about 20% total protein and being free of those particles which will go through a 60 mesh screen when the dehulled oats are pulverized to a fineness that will permit 85% to 95% thereof to pass through a 60 mesh screen.

2. A method of producing a water extract of a gummy oat fraction which comprises extracting with water an over 180° F. dry heated oat fraction containing in excess of about 20% total protein and being free of those particles which will go through a 60 mesh screen when the dehulled oats are pulverized to a fineness that will permit 85% to 95% thereof to pass through a 60 mesh screen, separating the water soluble fraction and concentrating the said soluble fraction to between 45% and 65% total solids.

3. A method of producing a water soluble extract of a gummy oat fraction which comprises dry heating the said oat fraction to over 180° F., extracting the said fraction with water, and then concentrating to between 45% and 70% total solids, said oat fraction containing in excess of about 20% total protein and being free of those particles which will go through a 60 mesh screen when the dehulled oats are pulverized to a fineness that will permit 85% to 95% thereof to pass through a 60 mesh screen.

4. A method of producing a water soluble extract of a gummy oat fraction which comprises dry heating the said oat fraction to over 180° F., extracting with water, adjusting the extract to pH 4 to 4.5, concentrating to between about 45% and 65% total solids, treating said concentrated fraction with about 7 parts of a 60% low molecular weight aliphatic alcohol and 40% water mixture to each part of the total solids of the concentrated fraction, removing the insoluble material, then concentrating the alcohol soluble fraction to between 70% and 80% total solids, said oat fraction containing in excess of about 20% total protein and being free of those particles which will go through a 60 mesh screen when the dehulled oats are pulverized to a fineness that will permit 85% to 95% thereof to pass through a 60 mesh screen.

5. A water and alcohol soluble extract of an over 180° F. dry heated, finely divided special oat fraction, said fraction having a fineness of at least about 60 mesh, said fraction containing in excess of about 20% total protein and being free of those particles which will go through a 60 mesh screen when the dehulled oats are pulverized to a fineness that will permit 85% to 95% thereof to pass through a 60 mesh screen.

6. A method of producing an extract of a gummy oat fraction which comprises dry heating the said oat fraction to over 180° F., extracting the said oat fraction with water using about 1 part of the oat fraction to between 4 and 6 parts of water at a pH between 4.0 and 6.0, removing the undissolved solids, concentrating the soluble portion to over about 27° Baumé, adjusting the concentrate to pH 6.8 to 7.5, diluting with water to obtain fluidity, removing the undissolved solids, adjusting the pH of the soluble fraction to between about 5.0 and 6.0, and then concentrating the purified extract to at least about 27° Baumé, said oat fraction containing in excess of about 20% total protein and being free of those particles which will go through a 60 mesh screen when the dehulled oats are pulverized to a fineness that will permit 85% to 95% thereof to pass through a 60 mesh screen.

SIDNEY MUSHER.

REFERENCES CITED

The following references are of record in the file of this patent:

UNITED STATES PATENTS

| Number | Name | Date |
|---|---|---|
| 1,555,170 | Trickey | Sept. 29, 1925 |
| 2,355,028 | Musher | Aug. 1, 1944 |
| 2,355,030 | Musher | Aug. 1, 1944 |
| 2,355,547 | Musher | Aug. 8, 1944 |

OTHER REFERENCES

"The Structure and Composition of Foods," by A. L. Winton et al., vol. I. Published 1932 by John Wiley and Sons, Inc., New York, pages 166 to 169, 173.